United States Patent
Stakutis et al.

(10) Patent No.: US 7,624,134 B2
(45) Date of Patent: Nov. 24, 2009

(54) ENABLING ACCESS TO REMOTE STORAGE FOR USE WITH A BACKUP PROGRAM

(75) Inventors: Christopher John Stakutis, Concord, MA (US); Kevin Michael Stearns, Maynard, MA (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 11/423,689

(22) Filed: Jun. 12, 2006

(65) Prior Publication Data
US 2007/0288525 A1 Dec. 13, 2007

(51) Int. Cl.
G06F 17/30 (2006.01)
(52) U.S. Cl. .............................. 707/204; 707/1; 707/10; 707/200; 707/205
(58) Field of Classification Search .................... 707/1, 707/10, 200–204
See application file for complete search history.

(56) References Cited

U.S. PATENT DOCUMENTS

| 5,566,331 | A | 10/1996 | Irwin, Jr. et al. |
| 5,771,354 | A * | 6/1998 | Crawford ..................... 709/229 |
| 6,484,186 | B1 | 11/2002 | Rungta |
| 6,748,504 | B2 | 6/2004 | Sawdon et al. |
| 2003/0182330 | A1 | 9/2003 | Manley et al. |
| 2003/0204700 | A1 | 10/2003 | Biessener et al. |
| 2004/0006702 | A1 | 1/2004 | Johnson |
| 2004/0117344 | A1 * | 6/2004 | Yang ............................. 707/1 |
| 2005/0125467 | A1 * | 6/2005 | Oosaki et al. ............... 707/204 |
| 2005/0216889 | A1 | 9/2005 | Sandwith |
| 2005/0227683 | A1 | 10/2005 | Draluk et al. |

FOREIGN PATENT DOCUMENTS

WO 02/069159 9/2002

OTHER PUBLICATIONS

Iomega "Iomega Automatic Backup Pro", May 6, 2005, p. 1-61.*
"Flexible Storage Solutions for the Internet Age", iBackup FAQ,copyright 1999, [online May 21, 2006] http:www.ibackup.com/ibwin/newibackup/faq.htm, pp. 1-54.
Y. Goland, et al., "HTTP Extensions for Distributed Authoring—WebDAV", Copyright The Internet Society 1999, [online May 20, 2006] http://tools.ietf.org/html/2518, pp. 1-78.

(Continued)

*Primary Examiner*—Cam-Linh Nguyen
(74) *Attorney, Agent, or Firm*—David W. Victor; Konrad Raynes and Victor LLP

(57) ABSTRACT

Provided are a method, system, and article of manufacture for enabling access to remote storage for use with a backup program. Access is enabled to remote storage offered by an Internet Service on a remote server over the Internet. Indication is maintained of files on a source drive in a backup set to store on the remote storage that have a real-time backup status. Te backup set is stored on the remote storage. A modification to a file on the source drive is detected and a determination is made from the indication whether the file being modified is indicated as having the real-time backup status. The modification is transferred to the file to the backup set at the remote storage in response to determining that the file being modified is indicated as having the real time status.

24 Claims, 4 Drawing Sheets

OTHER PUBLICATIONS

FIlesAnywhere [online May 21, 2006] http://www.filesanywhere.com/Help/Files/FilesAnywhere.pdf, pp. 1-5.

"Web + Remote Backup Plan", FilesAnywhere, [online May 21, 2006], http://backup.filesanywhere.com/FilesAnywherePortal_RemoteBackup.htm, pp. 1-2.

"Continuity@Work", Mobiliti, [online May 21, 2006], http://www.mobiliti.com/C@WVVersion4.html, pp. 1-2.

"Web-Based Backup Strategies", PC Today, vol. 2, Issue 11, Nov. 2004 [online May 21, 2006], http://www.pctoday.com/Editorial/article.asp?article=articles/2004/t021..., pp. 1-7.

"WebDAV", [online May 20, 2006] http://en.wikipedia.org/w/index.php?title=WebDAV&printable=yes, pp. 1-5.

* cited by examiner

Backup Settings

Remote Storage Access Information

ENABLING ACCESS TO REMOTE STORAGE FOR USE WITH A BACKUP PROGRAM

BACKGROUND OF THE INVENTION

1. Field of the Invention

The present invention relates to a method, system, and program for enabling access to remote storage for use with a backup program

2. Description of the Related Art

Many computer users subscribe to an Internet service, such as an Internet Service Provider (ISP), that provides access to remote storage over the Internet for that user. However, many computer users often do not take advantage of these remote storage resources nor bother to configure their available remote storage for use with application programs.

Backup programs backup data at a computer system to a backup storage device, which may comprise a local storage device or remote storage device. Remote storage backup typically involves the use of a secure connection, such as a corporate Virtual Private Network (VPN), to allow backup of data to a remote site. More recently, some backup programs allow users to backup data to a local drive in their file system that represents an online storage location to which backup data is transferred.

There is a need in the art for improved techniques to allow computer users to utilize remote storage resources with application programs, such as backup programs.

SUMMARY

Provided are a method, system, and article of manufacture for enabling access to remote storage for use with a backup program. Access is enabled to remote storage offered by an Internet Service on a remote server over the Internet. Indication is maintained of files on a source drive in a backup set to store on the remote storage that have a real-time backup status. Te backup set is stored on the remote storage. A modification to a file on the source drive is detected and a determination is made from the indication whether the file being modified is indicated as having the real-time backup status. The modification is transferred to the file to the backup set at the remote storage in response to determining that the file being modified is indicated as having the real time status.

Further provided are a method, system, and article of manufacture where access is enabled to remote storage for a user having an existing user account at an Internet service. The Internet service provides a remote server to make remote storage available to account holders over the Internet. Indication is maintained of files on a source drive in a backup set and the files in the backup set are copied to the remote storage. Modifications to files in the backup set on the source drive are written to at least one file on the remote storage.

DETAILED DESCRIPTION

Figure 1:
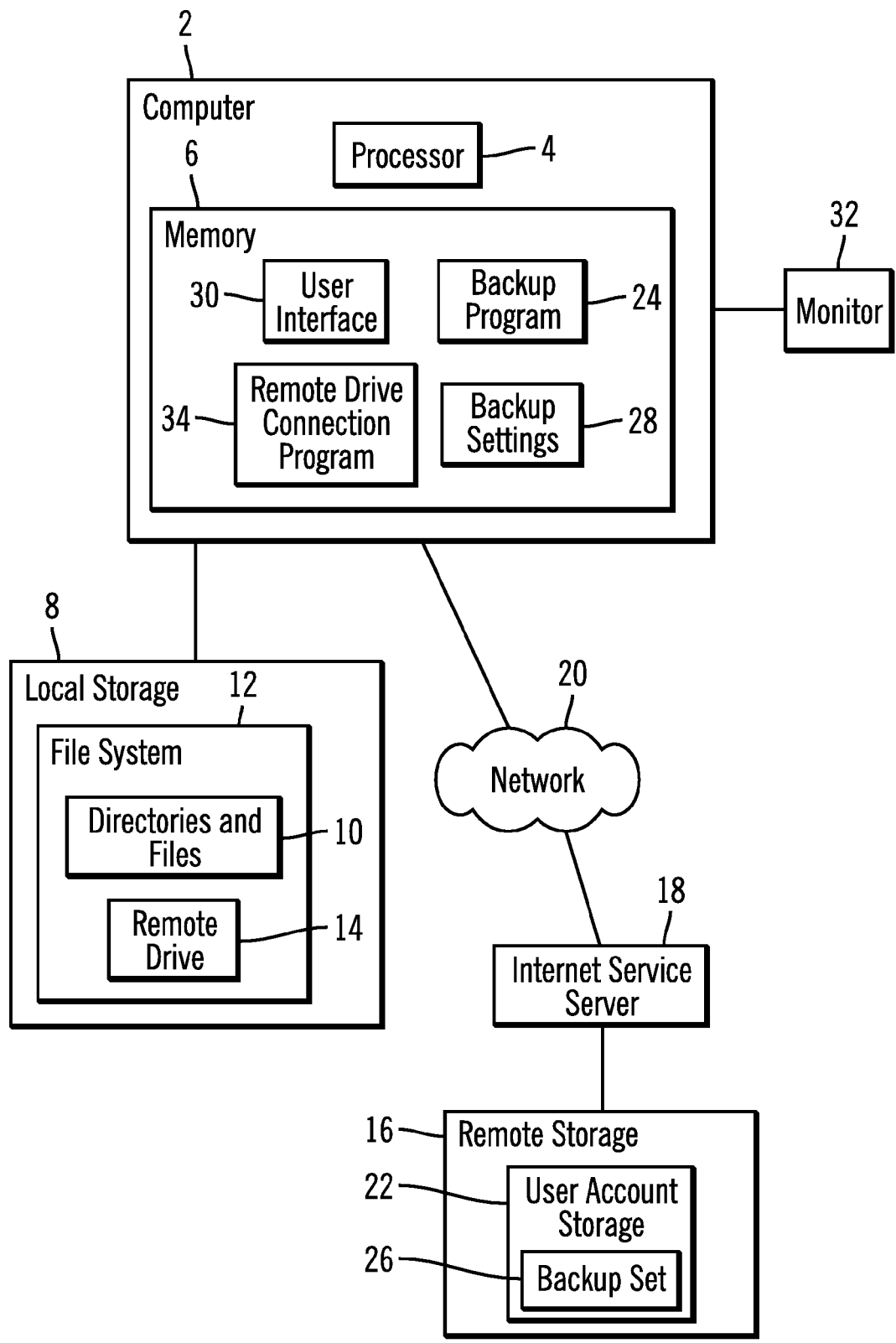
FIG. 1 illustrates of an embodiment of a network computing environment.

FIG. 1 illustrates a network computing environment in which embodiments are implemented. A computer 2 includes a processor 4 and a memory 6 comprised of one or more memory devices including the programs and code executed by the processor 4. The computer 2 has a local storage 8 including directories and files 10 in a file system 12. Further, the file system 12 includes a remote drive 14 providing a representation of a portion of remote storage 16 made available by an Internet service server 18 to a user of the computer 2 over the Internet 20. In one embodiment, the user has a user account at the Internet service, and the Internet service server 18 provides user account storage 22 for each subscribing user. For instance, the Internet service may comprise an Internet Service Provider (ISP) that provides remote storage as part of its services providing Internet access. Alternatively, the Internet service may comprise an entity that provides remote storage to subscribers.

The computer 2 further includes a backup program 24 executing in the memory 6 that transfers directories and files 10 in the local storage 8 to a backup set 26 in the user portion 22 of the remote storage 16. The backup program 24 is controlled by backup settings 28, including default settings and settings configured by a user of the backup program 24. The backup program 24 may generate a user interface 30 rendered on a computer monitor 32 in which the user may enter backup settings 28 to control the backup operations of the backup program 24.

The computer 2 further includes a remote drive connection program 34 that establishes a connection with the user account storage 22 in the remote storage 16. The remote drive connection program 34 may utilize Web-based Distributed Authoring and Versioning (WebDAV), the File Transfer Protocol (FTP), etc. to create a resource at the computer 2, such as a remote drive 14, which enables applications executing in the computer 2 to read and write data to the user account storage 22 at the remote storage 18.

The local 8 and remote 16 storages may be implemented in storage devices known in the art, such as one hard disk drive, a plurality of interconnected hard disk drives configured as Direct Access Storage Device (DASD), Redundant Array of Independent Disks (RAID), Just a Bunch of Disks (JBOD), etc., a tape device, an optical disk device, a non-volatile electronic memory device (e.g., Flash Disk), etc.

Figure 2:
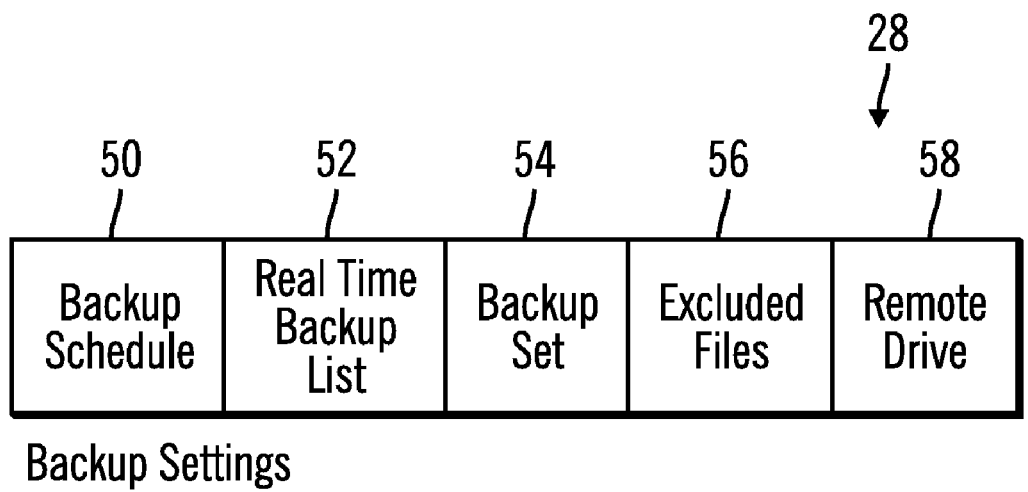
FIG. 2 illustrates an embodiment of backup settings used by a backup program.

FIG. 2 illustrates an embodiment of information that may be included in the backup settings 28, including: a backup schedule 50 indicating times during which a backup operation occurs to write backed-up files to the user account storage 22 at the remote storage 16; a real-time backup list 52 indicating directories, files or file types 10 that are subject to real-time backup to the remote storage 22 after the file is changed or modified; a backup set 54 indicating the local directories and files 10 to include in the copy of the backup set 26 at the remote storage 16, which may comprise a directory path or an entire logical device, e.g., the "c" drive; excluded files 56 indicating files, directories and/or file types in the source file system 12 to exclude from the backup; and a remote drive 58 indicating the user account storage 22 at the remote storage 16 to which the backup files are written.

In certain embodiments, the backup program 24 may maintain versions of backed-up files in the local storage 8, up to some user designated maximum number of versions. Thus, when a file, e.g., "file.txt" is modified, a suffix indicating a version number, e.g., "v1", "v2", etc., is appended to the most recent version of the file, e.g., "file.txt.v1", "file.txt.v2", etc., so that the changed file has the file name without the version information, e.g., "file.txt", which is the active version of the file. Once the local storage 8 reaches the version space limit, the backup program 24 may start deleting the oldest versions of files to keep the size of the local storage 8 below a space limit.

Figure 3:
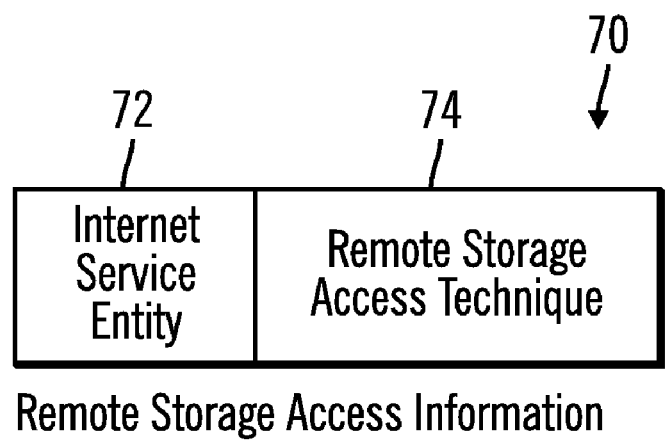
FIG. 3 illustrates an embodiment of remote storage access information.

FIG. 3 illustrates an embodiment of remote storage access information 70 the remote drive connection program 34 may maintain to configure a remote drive 14 depending on the Internet service entity with which the user of the computer 2 has an account. For each Internet service entity for which connection information is maintained, the remote storage access information 70 identifies an Internet service entity 72 and provides a remote storage access technique 74 comprising code or script commands that is executed to configure the computer 2 to communicate with the remote storage 16 to which the user has a user account 22.

Figure 4:
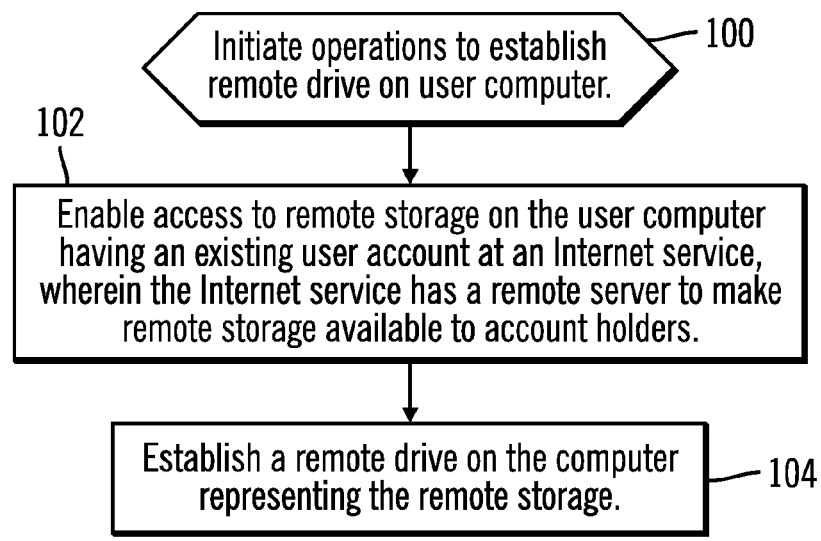
FIGS. 4 and 5 illustrate embodiments of operations to establish a remote drive on a user computer for use with an application program.

FIG. 4 illustrates an embodiment of operations performed by the remote drive connection program 34 to establish a connection between the computer 2 and the user account 22 at the remote storage 16. Upon initiating operations (at block 100), the remote drive connection program 34 enables (at block 102) access to remote storage 16 on the user computer having an existing user account at an Internet service. The Internet service has a remote server 18 to make user account storage 22 at the remote storage 16 available to account holders. The portion of remote storage 16 available to a particular user is shown as the user account storage 22. The remote drive connection program 34 may obtain the user password and account information with the Internet service and use a connection protocol, such as WebDAV, FTP, etc., to establish a connection to the user account storage 22 in the remote storage 22 on behalf of the computer 2. The remote drive connection program 34 may further establish (at block 104) a remote drive 14 on the computer representing the user account 22 on the remote storage 16. This remote drive 14 enables the computer 2 to perform file operations, such as read, write, open, save, etc., over the Internet to files in the user account storage 22.

In one embodiment, the Internet service entity may provide its subscribers with a copy of the remote drive connection program 34 to enable them to automatically and easily connect to their user account storage 22 by running the program so they do not have to configure the remote drive 14 themselves.

Figure 5:
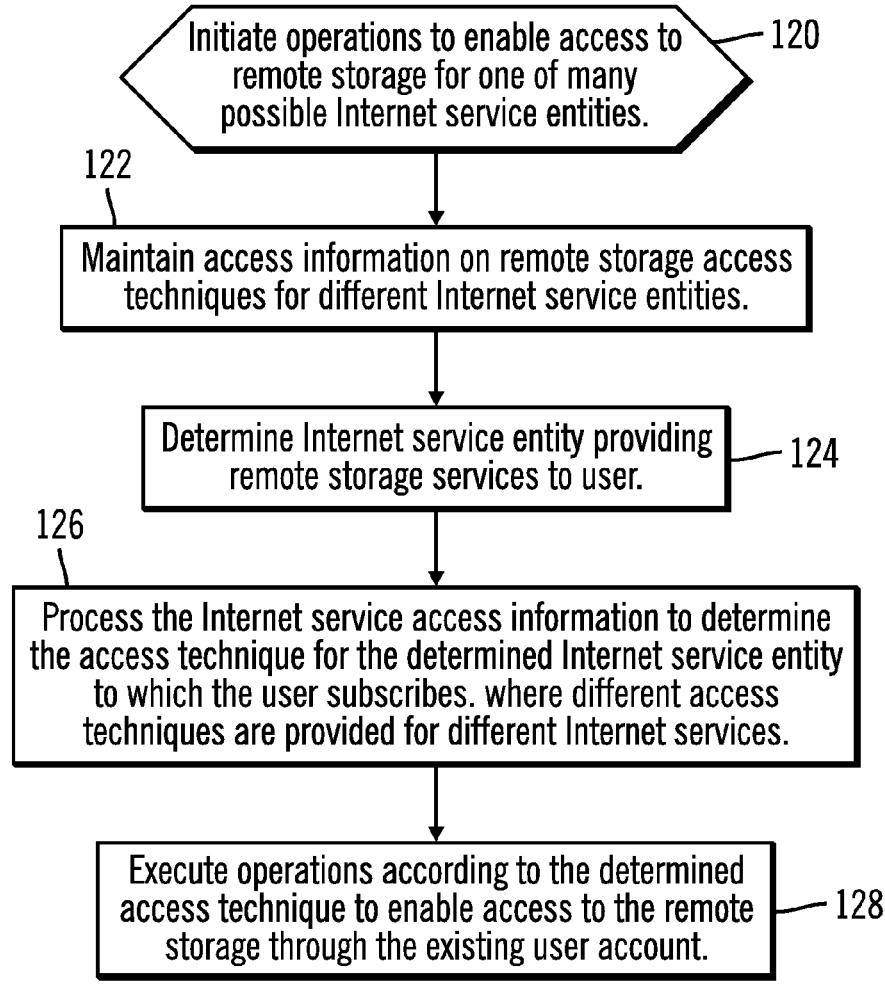

FIG. 5 illustrates an additional embodiment in which the remote drive connection program 34 includes remote storage access information 50 for different Internet service entities. To initiate (at block 120) operations to enable access to remote storage 2 for one of many possible Internet service entities, the remote drive connection program 34 maintains (at block 122) access information 70 (FIG. 3) on remote storage access techniques 74 for different Internet service entities 72, such as ISPs or other entities that provide remote storage services. Different access techniques are provided for different Internet service entities offering remote storage services. The remote drive connection program 34 determines (at block 124) the Internet service entity providing remote storage services 22 to the user of the computer 2, which may comprise the ISP to which the user of the computer 2 subscribes. The remote drive connection program 34 may determine the particular Internet service entity to which the user of the computer 2 subscribes by requesting the user to select via the user interface 30 from a list the Internet service entity providing access. Alternatively, the remote drive connection program 34 may automatically query certain data structures and registry information in the computer 2 to determine whether the user of the computer 2 subscribes to any Internet services offering remote storage. If the user does not subscribe to any remote storage services, then the remote drive connection program 34 may enable the user to establish a remote storage service subscription, e.g., free trial or paid subscription, and then continue on with configuring the connection after establishing the subscription.

The remote drive connection program 34 processes (at block 126) the Internet service access information 70 to determine the access technique 74 (FIG. 3) for the determined Internet service entity to which the user subscribes, where different access techniques are provided for different Internet service entities. The remote drive connection program 34 executes operations according to the determined access technique 74 to enable the computer 2 access to the user account storage 22 at the remote storage 22 through the existing user account. Enabling access may include creating a remote drive 14 representing the user account storage 22 at the remote storage 16 of the determined Internet service entity.

Vendors of software application programs whose programs may be configured to utilize a remote drive 14 on a user computer 2 representing remote storage 16 may distribute to their customers a remote drive connection program 34 implementing the operations of FIG. 5 to automatically and easily allow the user of their application to establish a connection to the remote storage 16 for use with the application program. For instance, backup program vendors may provide the remote drive connection program 34 implementing the operations of FIG. 5 to create a remote drive 14 which their backup program may utilize to write backup data to the user account 22 at the remote storage 16.

Figure 6:
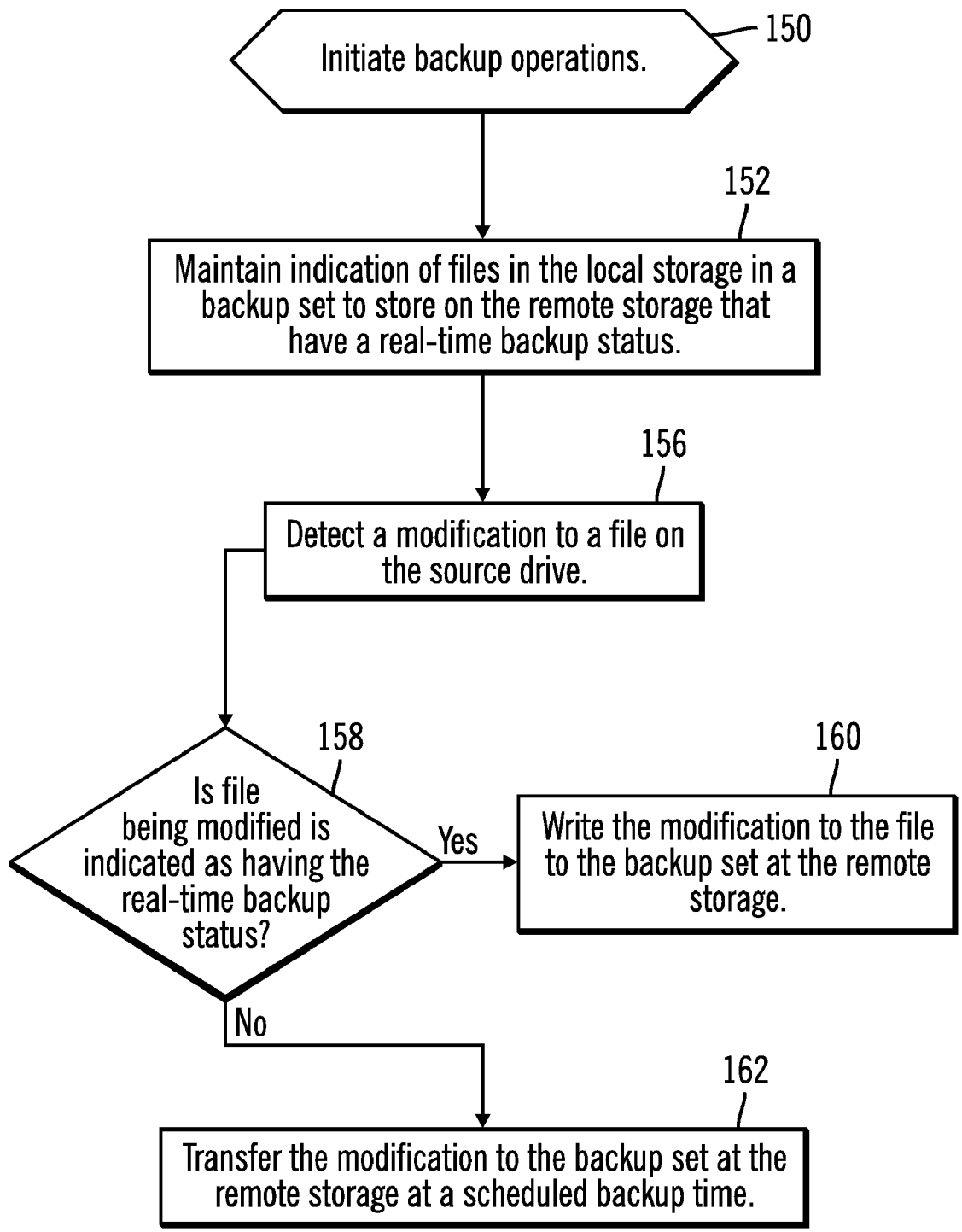
FIG. 6 illustrates an embodiment of operations performed by a backup program to backup changed files.

FIG. 6 illustrates an embodiment of operations performed by the backup program 24 to backup data at the remote storage 16. A full replication of the directories and files 10 indicated in the backup set 54 (FIG. 2) to the user account storage 22 at the remote storage 16 may have been previously performed by writing all files indicated in the backup set 54 to the remote drive 14 to create the backup set 26 at the user account storage 22. As part of backup operations (at block 100), the backup program 24 maintains (at block 102) indication, e.g., the real time backup list 52, of files to backup in the source file system 12 having the real-time backup status. Files in the defined backup set 52 not having the real-time status may be assumed to have a lower priority status. In response to detecting (at block 156) a change to a file in the defined backup set 54, if (at block 158) the changed file has the real-time or high status (e.g., on the real time list 52), then the backup program 24 writes (at block 160) the modification to the remote drive 14, which causes the transfer of the modification to the user account storage 22 over the network 20, e.g., Internet. Otherwise, if (at block 158) the modified file does not have the real-time status, then the backup program 24 transfers the modification to the backup set 26 at the remote storage at a scheduled backup time.

In one embodiment, the backup program 14 may transfer modifications to the backup set 26 on the remote storage 16 by writing the modification as an independent file to include in the backup set 26. Alternatively, the backup program 14 may submit a command directed to the remote drive 14 to append the modification to one or more files implementing the backup set 26 at the remote storage 16.

With the described embodiment of operations of FIG. 5, the backup program 24 writes changed files having the high (real-time) priority to the user account storage 22 at the remote storage 16 soon after the modifications are made.

In one embodiment, the backup program 24 that uses the remote drive 14 may be provided by a vendor of backup applications, which also may provide the remote drive connection program 34 performing the operations of FIG. 5 to configure a remote drive 14 for use with the backup application. In an additional embodiment, the Internet service entity that provides the user account storage 22 may provide their subscribers with the backup program 24 to use to backup user data to provide a software application that encourages use of the Internet service entity's remote storage services and subscriptions. As discussed, the Internet service entity may also provide a remote drive connection program 34 performing the operations of FIG. 4 to configure the remote drive for use with the provided application program.

The described embodiments provide techniques to allow configuration of remote storage resources for a user so that applications, such as backup applications, running on the user computer may use the remote storage. In certain embodiments, the computer user has a pre-existing account that provides for remote storage and the described embodiments leverage that existing remote storage capability to provide backup or other uses of the remote storage.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method performed by an Internet service, comprising:
   providing by the Internet service programs to execute in a computer including:
     a remote drive connection program executed in the computer to enable access from the computer to remote storage provided by the Internet service on a remote server over the Internet, wherein the remote drive connection program obtains a user password and user account information with the Internet service to use to establish a connection with the remote server and the remote storage for the user account; and
     a backup program executed on the computer to perform:
       indication of files on a source drive in a backup set in the computer to store on the remote storage that have a real-time backup status;
       storing the backup set on the remote storage;
       detecting a modification to a file on the source drive;
       determining from the indication whether the file being modified is indicated as having the real-time backup status; and
       transferring the modification to the file to the backup set at the remote storage in response to determining that the file being modified is indicated as having the real time status.

2. The method of claim 1, further comprising:
   transferring the modification to the backup set at the remote storage at a scheduled backup time in response to determining that the file being modified is indicated as not having the real time status.

3. The method of claim 1, further comprising:
   creating a remote drive representing the remote storage; and
   writing to the remote drive to write the backup set and modifications to the backup set to the remote storage.

4. The method of claim 3, wherein transferring the modification comprises writing the modification as an independent file to the remote drive.

5. The method of claim 3, wherein transferring the modification comprises appending the modification to one file on the remote drive comprising the backup set.

6. The method of claim 1, wherein the Internet service comprises an Internet Service Provider (ISP) providing Internet access for the user account.

7. A method, comprising:
   providing by a backup program vendor at least one program to execute in a computer including:
     a remote drive connection program executed in the computer to perform:
       maintaining Internet service access information on remote storage access techniques for different Internet services providing access to remote storage;
       processing the Internet service access information to determine the access technique for the Internet service providing an existing user account to a user of the computer, wherein different access techniques are provided for different Internet services, wherein the Internet services provide remote servers to make remote storage available to account holders over the Internet, wherein the remote drive connection program obtains a user password and user account information with at least one of the Internet services for which access information is maintained to use to establish a connection with the remote server and the remote storage provided by the Internet service for the user account;
       executing operations according to the determined access technique to enable access to the remote storage through the existing user account; and
     a backup program executed on the computer to perform:
       maintaining indication of files on a source drive in a backup set;
       copying the files in the backup set to the remote storage;
       detecting a modification to a file on the source drive;
       determining from the indication whether the file being modified is indicated as having a real-time backup status; and
       writing modifications to files in the backup set having the real-time backup status on the source drive to at least one file on the remote storage.

8. The method of claim 7, wherein the Internet service comprises an Internet Service Provider (ISP) providing Internet access for the user account.

9. A system maintained by an Internet service, comprising:
   a remote server including remote storage offered by an Internet Service, wherein the Internet Service provides user account storage to subscribers of the Internet Service to store their data in the remote storage; and
   a computer readable storage medium including programs provided by the Internet Service to the subscribers of the Internet Service to execute in computers of the subscribers, comprising:
     a remote drive connection program executed in the computer to enable access from the computer to remote storage offered by the Internet Service on a remote server over the Internet, wherein the remote drive connection program obtains a user password and user account information with the Internet service to use to establish a connection with the remote server and the remote storage for the user account; and
     a backup program executed on the computer of the subscriber to perform:
       maintaining indication of files on a source drive in a backup set in the computer to store on the remote storage that have a real-time backup status;
       storing the backup set on the remote storage;
       detecting a modification to a file on the source drive;
       determining from the indication whether the file being modified is indicated as having the real-time backup status; and
       transferring the modification to the file to the backup set at the remote storage in response to determining that the file being modified is indicated as having the real time status.

10. The system of claim 9, wherein the backup program further performs:
    transferring the modification to the backup set at the remote storage at a scheduled backup time in response to determining that the file being modified is indicated as not having the real time status.

11. The system of claim 9, wherein the remote drive connection program farther creates a remote drive representing the remote storage and wherein the backup program writes to the remote drive to write the backup set and modifications to the backup set to the remote storage.

12. The system of claim 11, wherein transferring the modification comprises writing the modification as an independent file to the remote drive.

13. The system of claim 11, wherein transferring the modification comprises appending the modification to one file on the remote drive comprising the backup set.

14. The system of claim 9, wherein the Internet service comprises an Internet Service Provider (ISP) providing Internet access for the user account.

15. A system maintained by a backup program vendor to provide access to at least one Internet service providing remote storage, wherein the Internet Service provides user account storage to subscribers of the Internet Service to store their data in the remote storage, comprising:

a computer readable storage medium including programs provided by the backup program vendor to the subscribers of the Internet Service to execute in computers of the subscribers, comprising:

a remote drive connection program executed in the computer to perform:

maintaining access information on remote storage access techniques for different Internet service entities; and processing the Internet service access information to determine the access technique for the Internet service providing an existing user account to a user of the computer, wherein different access techniques are provided for different Internet services, wherein the Internet service provides a remote server to make remote storage available to account holders over the Internet, wherein the remote drive connection program obtains a user password and user account information with the Internet service to use to establish a connection with the remote server and the remote storage for the user account; and a backup program executed on the computer to perform:

maintaining indication of files on a source drive in a backup set;

copying the files in the backup set to the remote storage;

detecting a modification to a file on the source drive;

determining from the indication whether the file being modified is indicated as having a real-time backup status; and writing modifications to files in the backup set having the real-time backup status on the source drive to at least one file on the remote storage.

16. The system of claim 15, wherein the Internet service comprises an Internet Service Provider (ISP) providing Internet access for the user account.

17. An article of manufacture comprising a computer readable storage medium having programs provided by an Internet service to subscribers to a remote storage in a remote server offered by the Internet service, wherein the programs are executed by computers of the subscribers to perform operations, the operations comprising:

a remote drive connection program executed in the computers to enable access from the computer to the remote storage offered by the Internet Service over the Internet, wherein the remote drive connection program obtains a user password and user account information with the Internet service to use to establish a connection with the remote server and the remote storage for the user account; and a backup program executed on the computer to perform:

maintaining indication of files on a source drive in a backup set in the computer to store on the remote storage that have a real-time backup status;

storing the backup set on the remote storage;

detecting a modification to a file on the source drive;

determining from the indication whether the file being modified is indicated as having the real-time backup status; and transferring the modification to the file to the backup set at the remote storage in response to determining that the file being modified is indicated as having the real time status.

18. The article of manufacture of claim 17, further comprising:

transferring the modification to the backup set at the remote storage at a scheduled backup time in response to determining that the file being modified is indicated as not having the real time status.

19. The article of manufacture of claim 17, further comprising:

creating a remote drive representing the remote storage; and writing to the remote drive to write the backup set and modifications to the backup set to the remote storage.

20. The article of manufacture of claim 19, wherein transferring the modification comprises writing the modification as an independent file to the remote drive.

21. The article of manufacture of claim 19, wherein transferring the modification comprises appending the modification to one file on the remote drive comprising the backup set.

22. The article of manufacture of claim 17, wherein the Internet service comprises an Internet Service Provider (ISP) providing Internet access for the user account.

23. An article of manufacture comprising a computer readable storage medium having programs provided by a backup program vendor to subscribers to a remote storage in a remote server offered by the Internet service, wherein the programs are executed by computers of the subscribers to perform operations, the operations comprising:

a remote drive connection program executed in the computer to perform:

maintaining access information on remote storage access techniques for different Internet service entities;

processing the Internet service access information to determine the access technique for the Internet service providing an existing user account to a user of the computer, wherein different access techniques are provided for different Internet services, wherein the Internet service provides a remote server to make remote storage available to account holders over the Internet, wherein the remote drive connection program obtains a user password and user account information with the Internet service to use to establish a connection with the remote server and the remote storage for the user account; and executing operations according to the determined access technique to enable access to the remote storage through the existing user account; and a backup program executed on the computer to perform:

maintaining indication of files on a source drive in a backup set;

copying the files in the backup set to the remote storage;

detecting a modification to a file on the source drive;

determining from the indication whether the file being modified is indicated as having a real-time backup status; and writing modifications to files in the backup set having the real-time backup status on the source drive to at least one file on the remote storage.

24. The article of manufacture of claim 23, wherein the Internet service comprises an Internet Service Provider (ISP) providing Internet access for the user account.

* * * * *